US008346444B2

(12) United States Patent
Fayyad et al.

(10) Patent No.: US 8,346,444 B2
(45) Date of Patent: Jan. 1, 2013

(54) REAL TIME TRANSMISSION SHIFT QUALITY DETECTION AND EVALUATION UTILIZING TRANSMISSION OUTPUT SHAFT ACCELERATION

(75) Inventors: Haytham A. Fayyad, Dexter, MI (US); William R. Mayhew, Ann Arbor, MI (US)

(73) Assignee: GM Global Technology Operations LLC

( * ) Notice: Subject to any disclaimer, the term of this patent is extended or adjusted under 35 U.S.C. 154(b) by 831 days.

(21) Appl. No.: 12/041,286

(22) Filed: Mar. 3, 2008

(65) Prior Publication Data

US 2008/0300747 A1   Dec. 4, 2008

Related U.S. Application Data

(60) Provisional application No. 60/932,928, filed on Jun. 1, 2007.

(51) Int. Cl.
   *B60W 10/00*   (2006.01)
   *F16H 59/48*   (2006.01)
   *G06F 17/00*   (2006.01)
   *G06F 19/00*   (2006.01)

(52) U.S. Cl. ............ 701/51; 701/29.1; 477/80; 477/120

(58) Field of Classification Search .............. 701/29, 701/31, 36, 51, 53, 64, 1, 55–62, 67, 68, 701/70, 29.1, 30.9, 31.1, 33.6; 477/34, 70, 477/71, 77–80, 83–89, 119, 120, 166, 169
See application file for complete search history.

(56) References Cited

U.S. PATENT DOCUMENTS

| | | | |
|---|---|---|---|
| 4,338,666 A | 7/1982 | Suzuki et al. | |
| 5,389,052 A * | 2/1995 | Kruse et al. | 477/121 |
| 5,855,533 A * | 1/1999 | Tolkacz et al. | 477/110 |
| 6,991,584 B2 * | 1/2006 | Cowan | 477/110 |
| 2001/0003721 A1 | 6/2001 | Saito et al. | |
| 2001/0005705 A1 * | 6/2001 | Kon et al. | 477/156 |
| 2005/0101435 A1 * | 5/2005 | Cowan | 477/83 |
| 2008/0021622 A1 * | 1/2008 | Katakura et al. | 701/61 |
| 2008/0096721 A1 * | 4/2008 | Honma et al. | 477/120 |
| 2008/0176710 A1 * | 7/2008 | Nohara et al. | 477/156 |

* cited by examiner

*Primary Examiner* — Thomas Tarcza
*Assistant Examiner* — Edward Pipala (57) ABSTRACT

A shift quality error detection system for an automatic transmission includes a vehicle acceleration determination module to determine a vehicle acceleration. An acceptance window module defines upper and lower limits of a desired vehicle acceleration. The shift quality error detection module compares the determined vehicle acceleration to the upper and lower limits of the desired vehicle acceleration. A shift quality error detection module selectively provides a shift quality error based on the comparison. A method of detecting shift quality error of an automatic transmission comprises determining a vehicle acceleration during a transmission gear shift. The method also includes comparing the vehicle acceleration to an acceptance window of desired vehicle accelerations and outputting an error signal based on the acceleration comparison.

20 Claims, 7 Drawing Sheets

REAL TIME TRANSMISSION SHIFT QUALITY DETECTION AND EVALUATION UTILIZING TRANSMISSION OUTPUT SHAFT ACCELERATION

CROSS-REFERENCE TO RELATED APPLICATIONS

This application claims the benefit of U.S. Provisional Application No. 60/932,928, filed on Jun. 1, 2007. The disclosure of the above application is incorporated herein by reference.

FIELD OF THE INVENTION

The present disclosure relates to vehicle transmissions, and more particularly to a transmission shift quality error detection system.

BACKGROUND

Internal combustion engines combust a fuel and air mixture within cylinders driving pistons to produce drive torque. The engine drives a transmission through a coupling device. In the case of an automatic transmission, the coupling device includes a torque converter. The transmission transfers the drive torque to a driveline through one of a plurality of gear ratios. The transmission shifts between gear ratios based on a shift schedule and vehicle operating conditions.

The transmission typically includes a plurality of clutches that are selectively engaged to establish a desired gear ratio. When shifting between gear ratios, clutch-to-clutch shifts may occur. More specifically, at least one clutch is disengaged (i.e., off-going clutch) while another clutch is concurrently engaged (i.e., on-coming clutch). Control of the clutch-to-clutch shift is based on many shift parameters including, but not limited to, estimated engine torque, a clutch fill time, a clutch pressure offset and a clutch full feed fill threshold pressure.

Electronically controlled transmissions may have self-learning algorithms that are designed to optimize the quality of gear shift events by altering a controlled parameter such as commanded pressure to one or more of the clutches. The self-learning algorithms can broadly be divided into categories including shift quality error detection, selection of parameters to adjust and magnitude of adjustment. It may be beneficial to provide an improved method of error detection.

SUMMARY

A shift quality error detection system for an automatic transmission includes a vehicle acceleration determination module to determine a vehicle acceleration. An acceptance window module defines upper and lower limits of a desired vehicle acceleration. The shift quality error detection module compares the determined vehicle acceleration to the upper and lower limits of the desired vehicle acceleration. A shift quality error detection module selectively provides a shift quality error based on the comparison.

Furthermore, a method of detecting shift quality error of an automatic transmission comprises determining a vehicle acceleration during a transmission gear shift. The method also includes comparing the vehicle acceleration to an acceptance window of desired vehicle accelerations and outputting an error signal based on the acceleration comparison.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1:
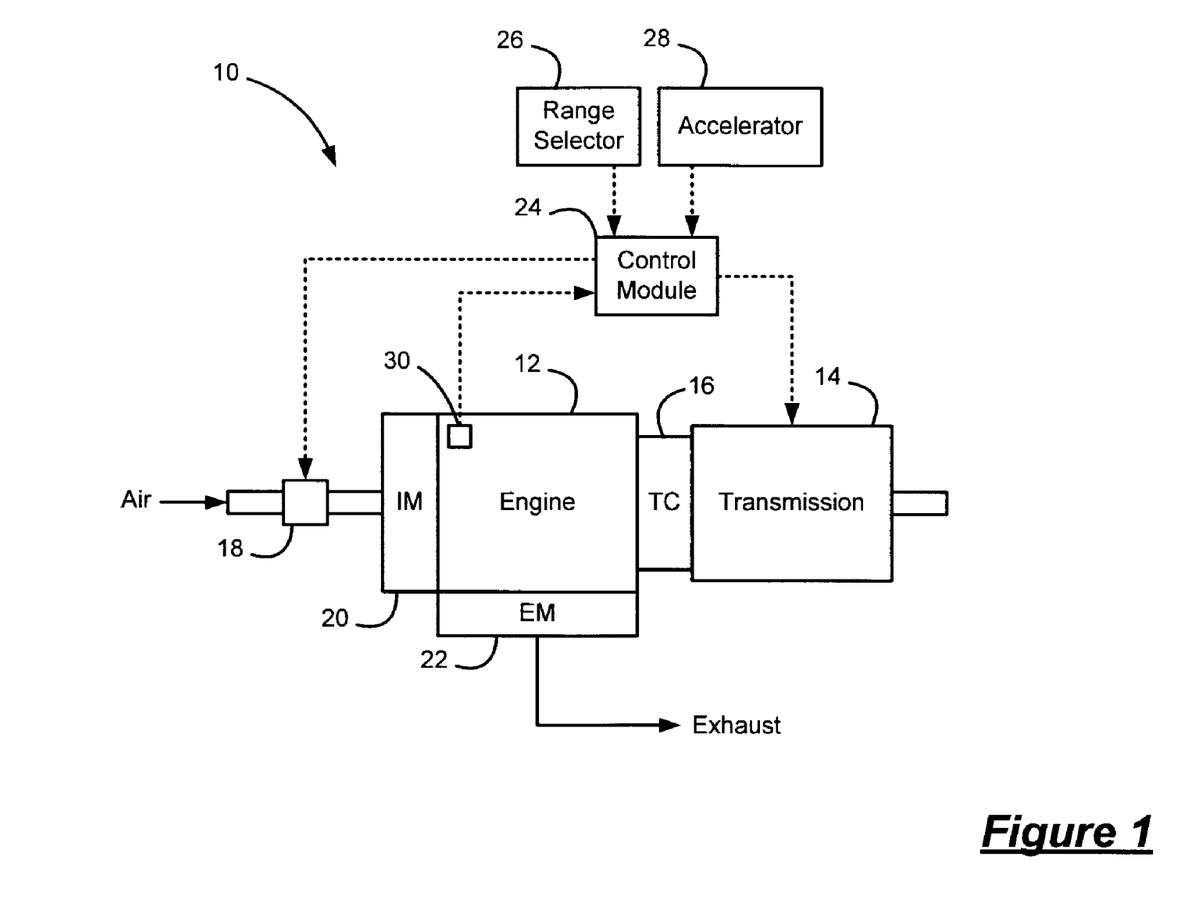
FIG. 1 is a functional block diagram of an exemplary vehicle system.

Referring now to FIG. 1, an exemplary vehicle system 10 is schematically illustrated. The vehicle system 10 includes an engine 12 that combusts a fuel and air mixture within cylinders (not shown) to drive pistons slidably disposed within the cylinders. The pistons drive a crankshaft (not shown) that drives a transmission 14 through a torque converter 16. Air is drawn through a throttle 18 and into an intake manifold 20 that distributes air to the individual cylinders. Exhaust generated by the combustion process is exhausted to an aftertreatment system (not shown) through an exhaust manifold 22.

The torque converter 16 is a fluid coupling that enables the engine to spin somewhat independently of the transmission 14. Although not illustrated, the torque converter 16 includes a pump, a turbine and a stator. The pump is a centrifugal pump that is driven by the engine 12. Fluid pumped by the pump, drives the turbine, which in turn drives the transmission 14. The stator redirects fluid returning from the turbine before it hits the pump again to increase the efficiency of the torque converter 16. In a torque converter stall condition, the pump is turning but the turbine is not.

A control module 24 regulates operation of the vehicle system 10. More specifically, the control module 24 operates the engine 12 and transmission 14 based on signals from operator input devices including, but not limited to, a range selector 26 and an accelerator pedal 28. The range selector 26 enables the operator to put the transmission 14 into one of a plurality of ranges including, but not limited to, a drive range (D), a reverse range (R), a neutral range (N) and a park range (P). The control module 24 also regulates transmission operation based on signals that may be provided by various sensors including, but not limited to, a vehicle acceleration sensor 30. The signal representative of vehicle acceleration need not be output by sensor 30 but may be modeled or estimated based on other vehicle data. For example, it should be noted that a third order Kalman filtered transmission output shaft speed signal may be used to generate a vehicle acceleration signal.

Shift quality is strongly related to vehicle acceleration because vehicle acceleration is directly related to the force acting on passengers within the vehicle. The force acting on the passengers is a major input to the subjective evaluation of the shift quality. The present disclosure provides a method of shift quality error detection including calculating a difference between desired vehicle acceleration and actual vehicle acceleration. Differences larger than predetermined amounts will be treated as shift quality errors.

Figure 2:
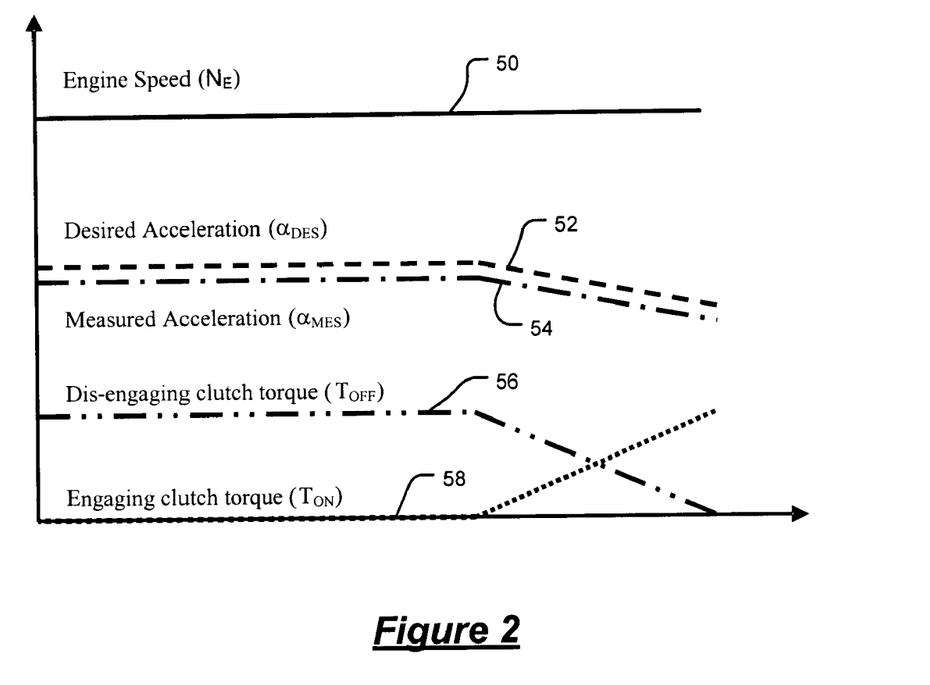
FIG. 2 is a graph illustrating an idealized power on up-shift torque phase.

FIG. 2 represents an idealized power on up-shift torque phase with near zero error. In this example, engaging and disengaging automatic transmission gear shift clutches are tuned correctly to produce a vehicle acceleration that is substantially a desired acceleration. The controlled phases of an idealized power on up-shift may be divided into two phases. In sequential order, a torque phase may exist followed by an inertia phase. FIG. 2 represents the torque phase portion of the shift. During the torque phase, the disengaging clutch carries significant torque. Furthermore, the engaging clutch holds torque but not a magnitude sufficient to initiate an engine speed change. Accordingly, the term "torque phase" carries the meaning that transmitted torque is changing without a significant change in speed of the major inertia in the powertrain. Because both the engaging the disengaging clutches are simultaneously carrying load, considerable input power is converted to heat energy inside of the transmission rather than being transmitted to the driven vehicle wheels. Accordingly, during the torque phase, there is a loss of vehicle acceleration. Transmission operation of this type may be termed "tie up."

FIG. 2 depicts a number of vehicle characteristics versus time during the up-shift torque phase. In particular, an engine speed trace 50 is shown depicting engine speed ($N_E$) having a substantially constant magnitude during the torque phase. A desired acceleration trace 52 depicts desired acceleration ($a_{DES}$) being substantially constant and decreasing once both the disengaging clutch and the engaging clutch are simultaneously actuated. Because FIG. 2 depicts an idealized shift, a measured acceleration trace 54 nearly overlies desired acceleration trace 52. As previously discussed, measured acceleration ($a_{MES}$) may be represented by a signal output from vehicle acceleration sensor 30, a third order Kalman filtered output speed signal or a vehicle acceleration estimation.

A disengaging clutch torque trace 56 is also depicted in FIG. 2. The disengaging clutch torque ($T_{OFF}$) is substantially constant at a predetermined magnitude and subsequently decreases to zero at the end of the torque phase. An engaging clutch torque trace 58 depicts engaging clutch torque ($T_{ON}$) as having a magnitude of zero for the first portion of the torque phase subsequently increasing while the disengaging clutch torque, $T_{OFF}$, reduces to zero.

Figure 3:
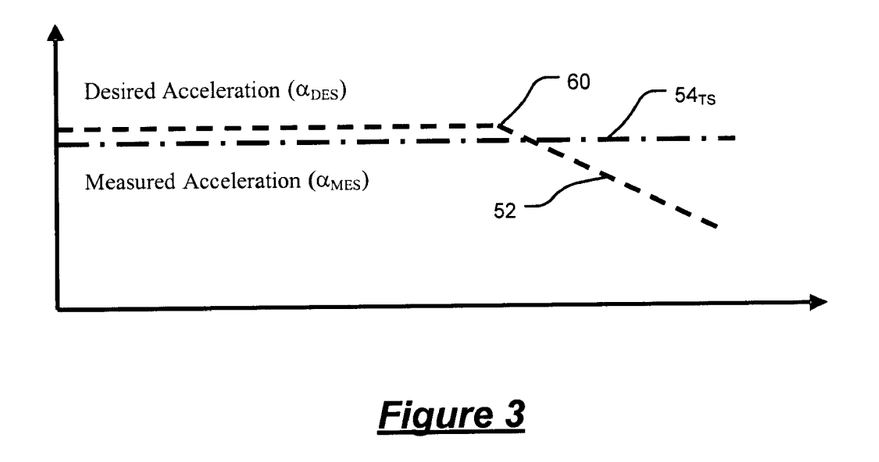
FIG. 3 is a graph illustrating a soft torque phase error.
Figure 4:
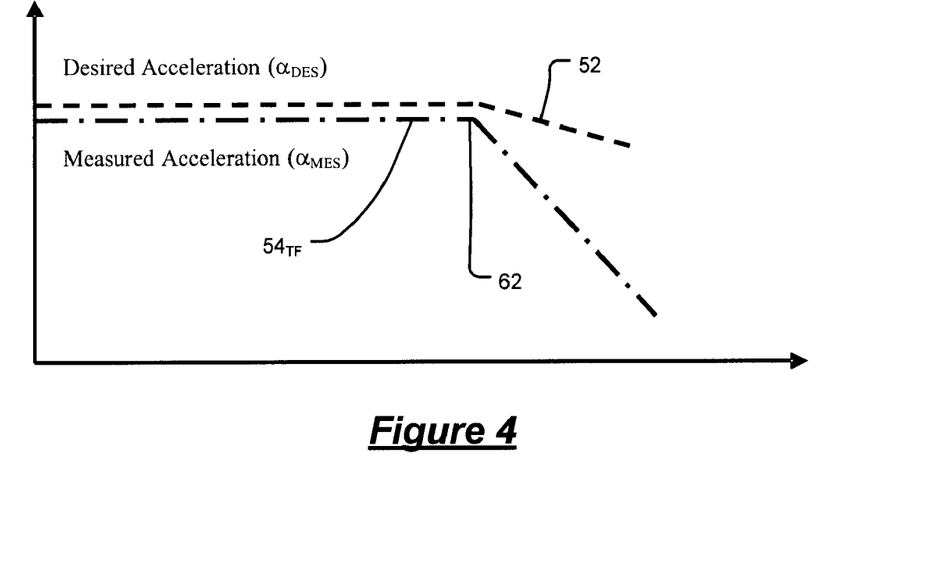
FIG. 4 is a graph illustrating a firm torque phase error.

For a variety of reasons including vehicle component variability, measured acceleration, $a_{MES}$, does not always nearly match desired acceleration, $a_{DES}$. FIGS. 3 and 4 depict two forms of power on up-shift torque phase errors. In particular, FIG. 3 represents a soft torque phase while FIG. 4 depicts a firm torque phase. A soft torque phase may indicate a failure mode for the engaging clutch. A soft torque phase exists when the engaging clutch produces torque that is too low relative to a desired amount. Accordingly, the engaging clutch does not produce enough torque to reduce the vehicle acceleration a desired amount. The result is a higher than desired vehicle acceleration. This condition may also be identified as not enough tie up. FIG. 3 graphically depicts a soft torque phase where desired acceleration trace 52 includes a knee 60 and desired acceleration $a_{DES}$ begins to decrease thereafter. Measured acceleration trace 54$_{TS}$ does not include a corresponding knee but maintains a constant value.

FIG. 4 depicts a firm torque phase error. Firm torque phase relates to the torque generated by the engaging clutch being higher than a desired amount. If the engaging clutch torque is too high, excessive tie up would exist. As a result, measured acceleration trace 54$_{TF}$ decreases from a knee at point 62 at a greater rate than desired acceleration, $a_{DES}$.

The time at which the torque phase ends and the inertia phase begins may be handled by the same calculation that determined desired vehicle acceleration. While a detailed description of the calculations is outside the scope of this paper, it may be beneficial to note that during an ideal shift, the torque phase ends when the engaging clutch generates sufficient torque to maintain the given engine speed and torque while, simultaneously, the disengaging clutch torque exactly equals zero. The inertia phase of the power on up-shift occurs when the engaging clutch torque is large enough to cause an engine speed change. Specifically, the term inertia phase relates to the time during a shift when the engaging clutch torque causes a significant change in speed of the major powertrain inertia. Typically, engine inertia is a dominant value among the inertia of the various components that must change speed during an up-shift. For purposes of discussion, a single lumped inertia at the engine will be assumed. During a power on up-shift, the forced change in speed of the engine, $N_E$, corresponds to a reaction that occurs to counterbalance the action slowing the engine down. The action is a transfer of energy or "inertial torque" transferred to the vehicle. A vehicle acceleration greater than would be provided by engine combustion torque alone occurs. The increase in vehicle acceleration may be termed "push."

Figure 5:
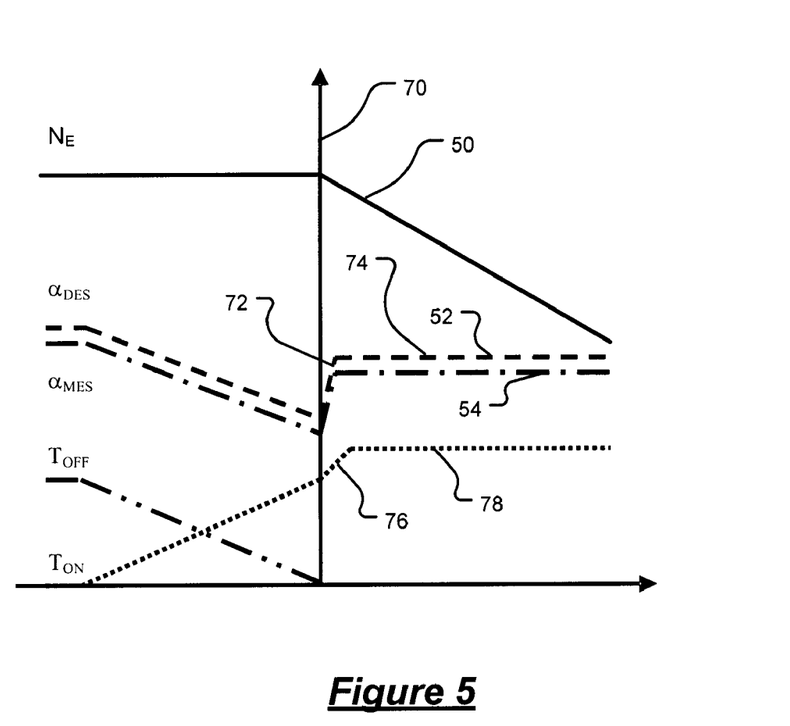
FIG. 5 is a graph illustrating an idealized power on up-shift torque phase and inertia phase.

FIG. 5 depicts an idealized power on up-shift inertia phase with near zero error. The inertia phase follows the torque phase discussed above. The torque phase is shown in the left side of FIG. 5 for reference. In the idealized shift of FIG. 5, the engaging and disengaging clutches are tuned correctly to produce a vehicle acceleration that is nearly the desired acceleration, $a_{DES}$.

The torque phase ends and the inertia phase begins at vertical line 70. During the inertia phase, engine speed $N_E$ decreases as indicated by engine speed trace 50. Desired acceleration trace 52 includes an initial relatively steeply sloped increasing portion 72 followed by a portion 74 having a substantially constant magnitude. During an idealized power on up-shift, the measured acceleration trace 54 closely resembles desired acceleration trace 52. FIG. 5 also shows engaging clutch torque trace 58 having a portion 76 of increasing torque at a rate slightly greater than the rate of increase during the torque phase. A substantially constant torque portion 78 follows portion 76.

Figure 6:
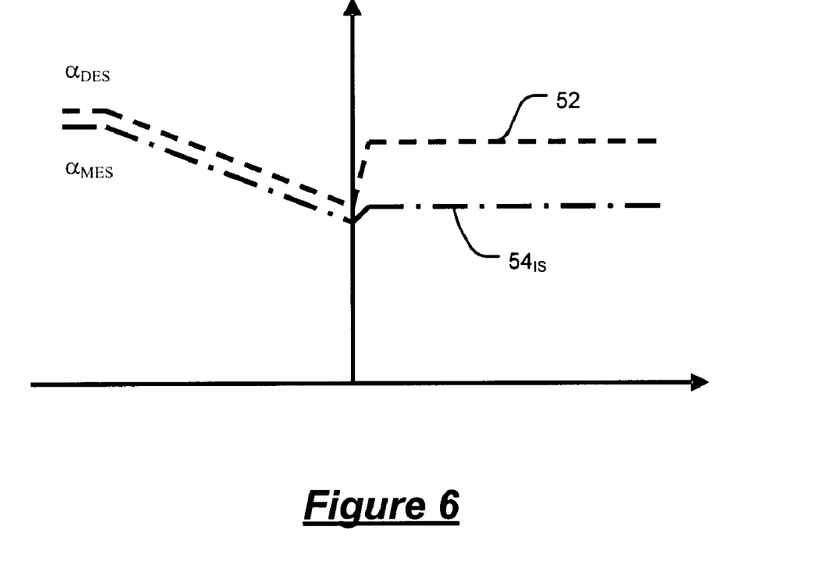
FIG. 6 is a graph illustrating a power on up-shift soft inertia phase error.
Figure 7:
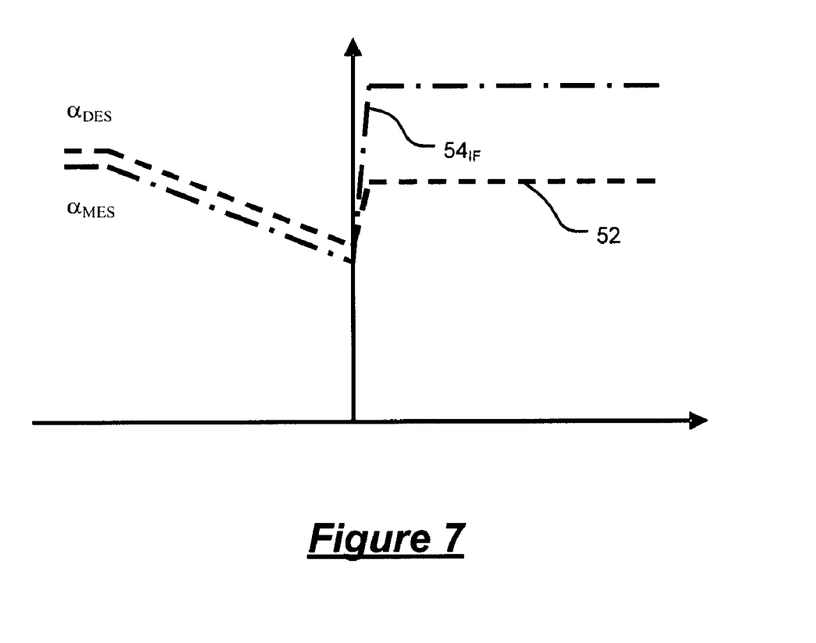
FIG. 7 is a graph illustrating a firm inertia phase error.

FIGS. 6 and 7 depict power on up-shift inertia phase errors. More particularly, FIG. 6 depicts a soft inertia phase error while FIG. 7 depicts a firm inertia phase error. A soft inertia phase error may occur if the engaging clutch torque is lower than a desired amount. If the engaging clutch does not cause a significant engine speed change, this would result in a lower increase in vehicle acceleration or not enough push. Measured acceleration trace $54_{TS}$ depicts measured acceleration, $a_{MES}$ being significantly lower than desired acceleration trace 52.

FIG. 7 relates to a firm inertia phase error typically caused by the engaging clutch torque being higher than a desired amount. A greater amount of energy from the engine inertia is transferred to the vehicle causing the measured acceleration, $a_{MES}$ to be greater than the desired acceleration $a_{DES}$. A measured acceleration trace $54_{IF}$ represents firm inertia phase error.

Figure 8:
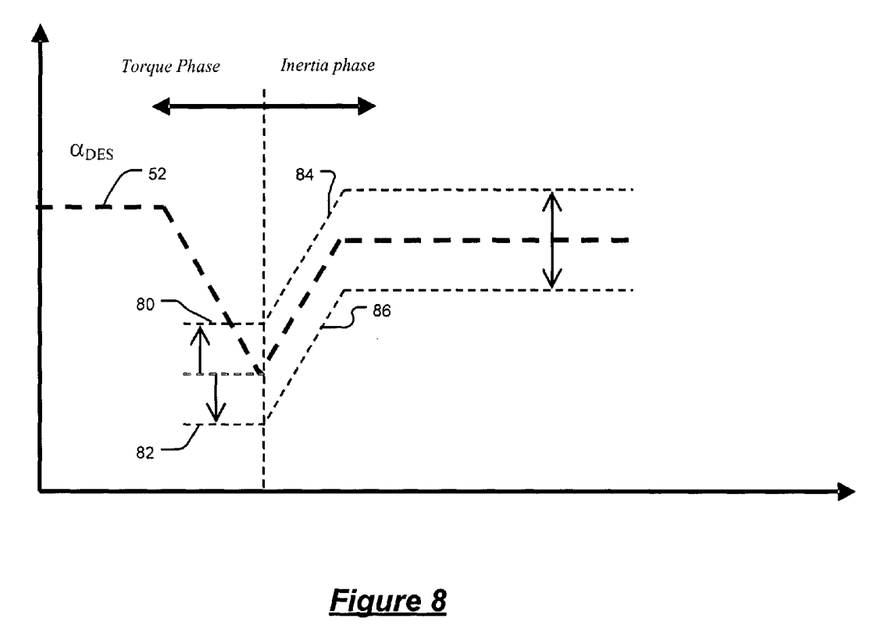
FIG. 8 is a graph illustrating an exemplary desired acceleration having torque phase and inertia phase error dead bands.

It should be understood that controlling engine 12 and transmission 14 to exactly replicate the desired acceleration trace 52 may be impractical. Accordingly, the shift quality error detection system implemented by control module 24 establishes an acceptance window of error relative to the desired acceleration trace 52. FIG. 8 illustrates desired acceleration trace 52 having balanced error torque phase dead bands and inertia phase dead bands. An upper torque phase error limit is depicted at line 80 while a lower torque phase error limit is shown at line 82. Similarly, an upper inertia phase error limit is identified at reference numeral 84 while a lower inertia phase error limit is shown at reference numeral 86. The magnitude of desired acceleration may vary during vehicle operation based on operator input such as a signal received from accelerator pedal 28. Torque phase and inertia phase error dead bands continue to be referenced from the desired acceleration trace 52 regardless of the magnitude of acceleration requested. Furthermore, it should be appreciated that while symmetrical upper and lower error acceptance limits are depicted, the dead bands need not be balanced and the high and low error limits may differ from one another without departing from the scope of the present disclosure.

Figure 9:
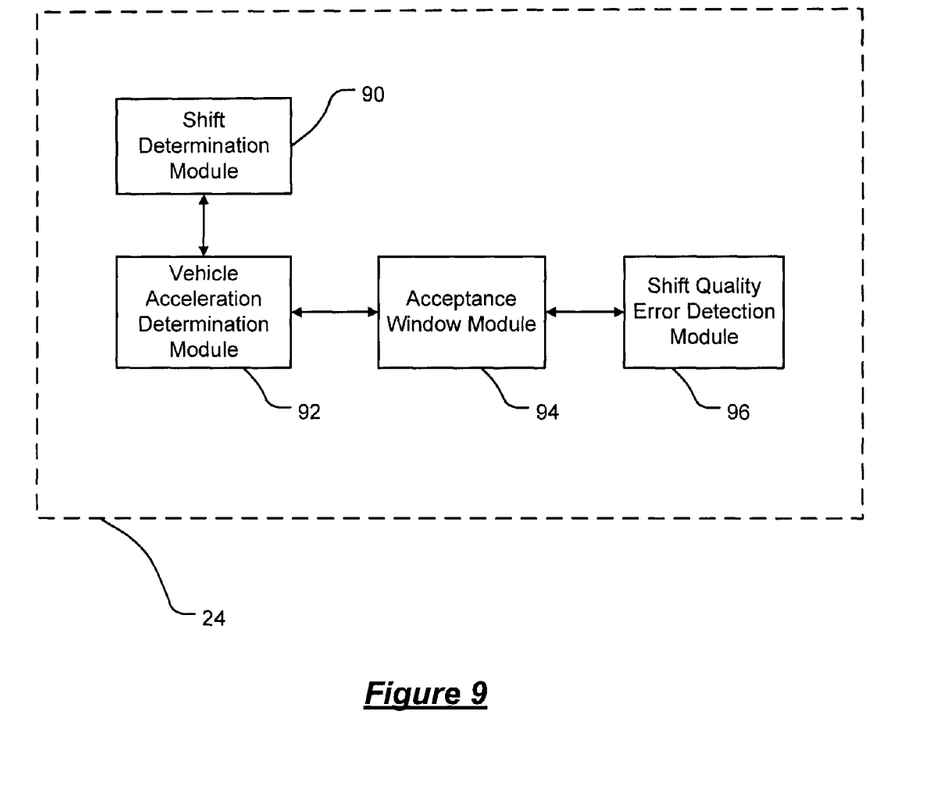
FIG. 9 is a functional block diagram of a shift quality error detection system.

FIG. 9 depicts a functional block diagram of the shift quality error detection system of the present disclosure. In particular, it is contemplated that control module 24 includes a shift determination module 90 to determine when a transmission gear shift is occurring. The shift determination module may also determine whether the torque phase is active or the inertia phase is active. Shift determination module 90 is in communication with a vehicle acceleration determination module 92. Vehicle acceleration determination module 92 determines the vehicle acceleration. As previously stated, vehicle acceleration sensor 30 may be in communication with vehicle acceleration determination module 92. Alternatively, vehicle acceleration determination module 92 may evaluate the speed of a transmission output shaft (not shown) and apply a third order Kalman filter to the speed signal to generate vehicle acceleration. Other methods of determining vehicle acceleration are deemed to be within the scope of the present disclosure.

An acceptance window module 94 is in communication with vehicle acceleration determination module 92. Acceptance window module 94 defines upper and lower limits of a desired vehicle acceleration. The upper and lower limits may or may not be symmetrical about desired acceleration trace 52. A shift quality error detection module 96 is in communication with acceptance window module 94. Shift quality error detection module 96 is operable to compare the determined vehicle acceleration to the upper and lower limits of the desired vehicle acceleration. A shift quality error may be output from shift quality error detection module 96 based on the comparison of the determined vehicle acceleration to the upper and lower limits of the desired vehicle acceleration.

Figure 10:
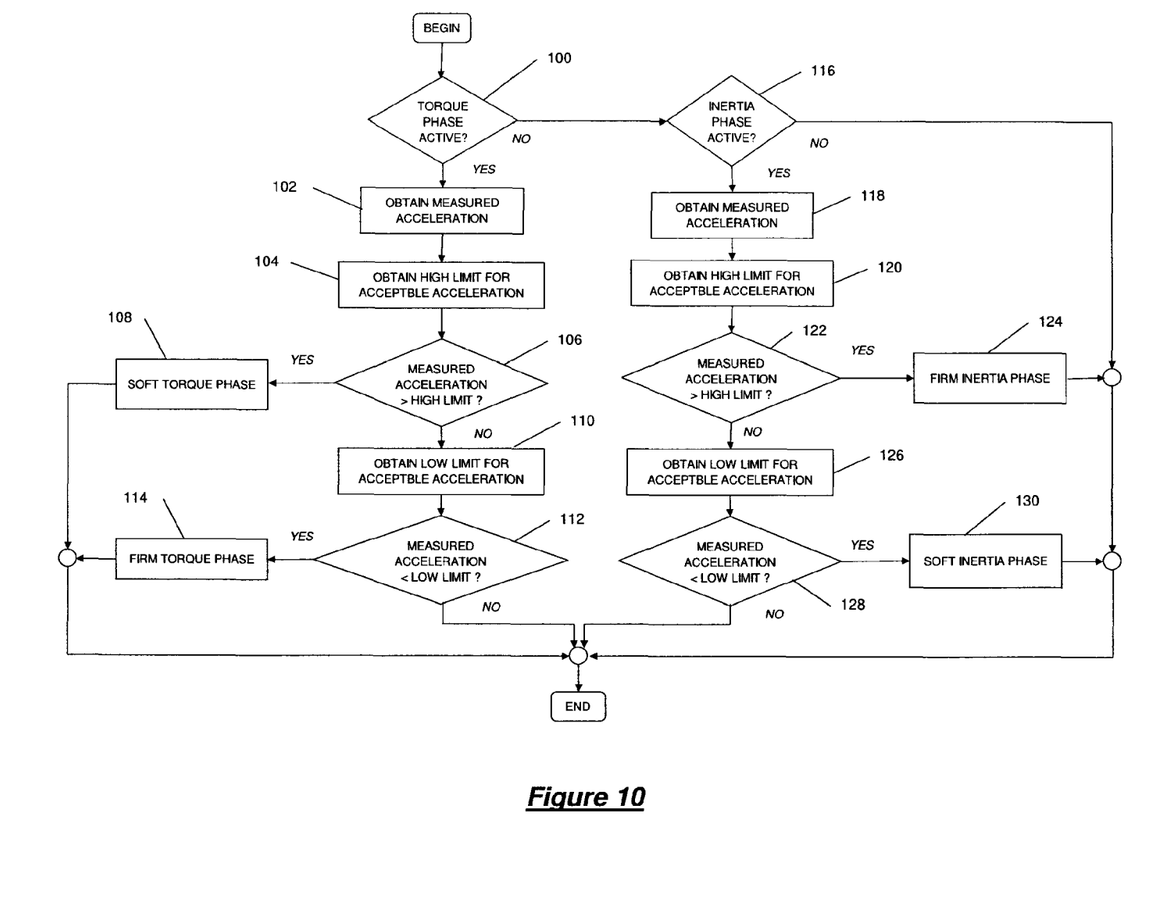
FIG. 10 is a flow chart illustrating exemplary steps executed by the shift quality error detection system.

As will be described in detail with reference to FIG. 10, control compares measured acceleration, $a_{MES}$ to the high and low limits during the torque phase and inertia phase during a power on up-shift. If the measured acceleration is within the given acceptance window, no error signal is emitted. On the contrary, if measured acceleration is outside of the torque phase or inertia phase error dead bands, a representative error signal is output. Control begins at decision block 100 to determine if a torque phase is active. This determination may be made by control module 24 sensing that an up-shift has been requested from the vehicle operator or another portion of the control module. If the torque phase is active, control proceeds to step 102 where a measured acceleration signal is obtained. Control proceeds to step 104 where a high limit for acceptable acceleration is obtained.

Decision block 106 determines if the measured acceleration is greater than the higher limit. If so, the soft torque phase has been entered and an appropriate error signal is output at block 108. Control then ends. If the measured acceleration is not greater than the high limit, the lower limit for acceptable acceleration is obtained at block 110. Control determines if the measured acceleration is less than the low limit at decision block 112. If the measured acceleration is less than the low limit, a firm torque phase has been entered. A firm torque phase error signal is output at block 114. Control ends thereafter.

If the torque phase is not active as determined at block 100, control determines if an inertia phase is active at block 116. If the inertia phase is not active, control ends. If the inertia phase is active, measured acceleration $a_{MES}$ is obtained at block 118. Control continues to block 120 where the high limit for acceptable acceleration is obtained. At decision block 122, it is determined whether measured acceleration $a_{MES}$ is greater than the high limit. If so, a firm inertia phase has been entered. An error signal indicating entry into the firm inertia phase is output at block 124. Control ends thereafter. If the measured acceleration $a_{MES}$ is not greater than the high limit as determined in block 122, control continues to block 126 where a low limit for acceptable acceleration is obtained. Control continues to block 128 where measured acceleration $a_{MES}$ is compared to the low limit for acceptable acceleration. If measured acceleration $a_{MES}$ is less than the low limit, a soft inertia phase has been entered. An error indicating entry into the soft inertia phase is output at block 130. Control ends after outputting the soft inertia phase signal. If measured acceleration $a_{MES}$ is not less than the low limit, control ends.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A shift quality error detection system for an automatic transmission, comprising:
   a vehicle acceleration determination module to determine a vehicle acceleration based on a change in speed of an output shaft;
   an acceptance window module defining upper and lower limits of a desired vehicle acceleration; and
   a shift quality error detection module that compares the determined vehicle acceleration to the upper and lower limits of the desired vehicle acceleration and that selectively generates a shift quality error based on the comparison.

2. The system of claim 1 wherein the acceptance window module determines upper and lower limits of desired vehicle acceleration based on a desired acceleration.

3. The system of claim 2 wherein the desired acceleration includes a torque phase and an inertia phase that sequentially occur, the torque phase occurring during a clutch to clutch shift.

4. The system of claim 3 further including a shift determination module to determine when a transmission gear shift is occurring, wherein the vehicle acceleration determination module communicates with the shift determination module and determines vehicle acceleration based on the shift request.

5. The system of claim 4 wherein the shift determination module determines whether the torque phase is active.

6. The system of claim 5 wherein the shift determination module determines whether the inertia phase is active.

7. The system of claim 6 wherein the shift quality error detection module outputs an error signal representative of one of a soft torque phase, a firm torque phase, a soft inertia phase and a firm inertia phase.

8. The system of claim 7 wherein the torque phase occurs when a vehicle engine speed remains substantially constant while an engaging clutch increases torque transfer and a disengaging clutch decreases torque transfer.

9. The system of claim 7 wherein the inertia phase begins when a vehicle engine speed remains substantially constant while the engaging clutch transfers sufficient torque to maintain a given engine speed and the disengaging clutch transfers zero torque.

10. A method of detecting shift quality error of an automatic transmission, comprising:
   determining a change in an output shaft speed;
   determining a vehicle acceleration based on the change in output shaft speed during a transmission gear shift;
   comparing the vehicle acceleration to an acceptance window of desired vehicle accelerations; and
   outputting an error signal based on the acceleration comparison, wherein the outputting is executed by a computer processor.

11. The method of claim 10 wherein determining the vehicle acceleration includes applying a third order Kalman filter to a transmission output shaft speed signal.

12. The method of claim 10 further including:
   determining whether a torque phase is active; and
   comparing the vehicle acceleration to upper torque phase and lower torque phase limits that define a portion of the acceptance window.

13. The method of claim 12 further including outputting a soft torque phase error signal when the vehicle acceleration is greater than the upper torque phase limit.

14. The method of claim 13 further including outputting a firm torque phase error signal when the vehicle acceleration is less than the lower torque phase limit.

15. The method of claim 12 wherein the upper torque and lower torque phase limits are equally offset from a desired vehicle acceleration during the torque phase.

16. A method of detecting shift quality error of an automatic transmission, comprising:
   determining whether an inertia phase is active; acid
   comparing the vehicle acceleration to upper inertia phase and lower inertia phase limits that define a portion of an acceptance window of desired vehicle accelerations; and
   outputting an error signal based on the acceleration comparison, wherein the outputting is executed by a computer processor.

17. The method of claim 16 further including outputting a firm inertia phase error signal when the vehicle acceleration is greater than the upper inertia phase limit.

18. The method of claim 16 further including outputting a soft inertia phase error signal when the vehicle acceleration is less than the lower inertia phase limit.

19. The method of claim 16 wherein the upper inertia and lower inertia phase limits are equally offset from a desired vehicle acceleration during the inertia phase.

20. The method of claim 16 wherein determining whether the inertia phase is active includes determining whether an engaging clutch transfers sufficient torque to maintain a given engine speed while the torque transferred by a disengaging clutch is zero.

* * * * *